United States Patent [19]
Kotani

[11] Patent Number: 5,126,598
[45] Date of Patent: Jun. 30, 1992

[54] JOSEPHSON INTEGRATED CIRCUIT HAVING AN OUTPUT INTERFACE CAPABLE OF PROVIDING OUTPUT DATA WITH REDUCED CLOCK RATE

[75] Inventor: Seigo Kotani, Zama, Japan
[73] Assignee: Fujitsu Limited, Japan
[21] Appl. No.: 589,460
[22] Filed: Sep. 28, 1990

[30] Foreign Application Priority Data
Sep. 29, 1989 [JP] Japan .................. 1-255869

[51] Int. Cl.⁵ .................. H03K 19/195; H03K 19/20
[52] U.S. Cl. .................. 307/462; 307/480; 364/239.1; 364/270.6; 505/829; 505/859
[58] Field of Search .................. 307/462, 480; 364/239.1, 239.7, 238.6, 270.6; 505/829, 859

[56] References Cited
U.S. PATENT DOCUMENTS

| | | | |
|---|---|---|---|
| 4,367,420 | 1/1983 | Foss et al. | 307/471 |
| 4,501,975 | 2/1985 | Josephs et al. | 307/462 |
| 4,633,439 | 12/1986 | Harada et al. | 307/462 |

OTHER PUBLICATIONS
Kotani et al., IEEE ISSOC 90, pp. 148–286, 1986.
Fujimaki et al., IEEE Transactions on Electron Devices, vol. 36, No. 2, Feb. 1989.
Ohara et al., ISEC'90, Extended Abstract.

*Primary Examiner*—David C. Nelms
*Assistant Examiner*—Richard Roseen
*Attorney, Agent, or Firm*—Staas & Halsey

[57] ABSTRACT

A Josephson integrated circuit includes a Josephson logic processor operated at a first clock rate, and a latch circuit formed of Josephson devices operated at the first clock rate for receiving output data from the Josephson processor together with a status signal for holding the output data. The latch circuit is supplied with a clear signal for resetting the output data therefrom. In addition, the invention includes therefrom a data output circuit formed of Josephson devices operated in response to a second clock rate that is slower than the first clock rate, wherein the data output circuit has an output terminal and supplied with the output data held in the latch means for passing the output data to the output terminal at the second clock rate. Further, the data output means produces the clear signal at the second clock rate.

10 Claims, 8 Drawing Sheets

CASE I (INITIAL)

| STEP | CLK | 10f | 10e1 | OR 21 | AND 29 | OR 25 | OR 32 | OR 22 | OR 24 | OR 26 | OR 31 | INV OR 33 | OR 23 | INV 30 | OR 27 | AND 34 | AND 35 |
|------|-----|-----|------|-------|--------|-------|-------|-------|-------|-------|-------|-----------|-------|--------|-------|--------|--------|
| 1 $\phi_2$ | 0 | 0 | 0 | 0 | 0 | 0 | 0 | R | R | R | R | R | 0 | 1 | 0 | 0 | 0 |
| 2 $\phi_3$ | 0 | 0 | 0 | 0 | 0 | 0 | 0 | 0 | 0 | 0 | 0 | 0 | R | R | R | R | R |
| 3 $\phi_1$ | 0 | 0 | 0 | R | R | R | R | 0 | 0 | 0 | 1 | 0 | 0 | 1 | 0 | 0 | 0 |

FIG. 6A

CASE II (SET)

| STEP | CLK | 10f | 10e₁ | OR 21 | OR AND 29 | OR 25 | OR 32 | OR 22 | OR 24 | OR 26 | OR INV 31 | OR INV 33 | OR 23 | OR INV 30 | OR 27 | OR AND 34 | AND AND 35 |
|---|---|---|---|---|---|---|---|---|---|---|---|---|---|---|---|---|---|
| 11 | $\overline{\phi_2}$ | — | D | — | O | — | O | R | R | R | R | R | O | — | O | O | O |
| 12 | $\overline{\phi_3}$ | — | D | — | O | — | O | R | O | R | O | O | R | R | R | R | R |
| 13 | $\overline{\phi_1}$ | — | D | R | R | R | R | O | — | — | O | O | R | — | O | D | R |
| 14 | $\overline{\phi_2}$ | O | O | O | — | O | D | R | R | R | R | R | — | — | O | D | O |
| 15 | $\overline{\phi_3}$ | O | O | O | — | O | D | — | O | O | D | D | R | R | R | R | O |
| 16 | $\overline{\phi_1}$ | O | O | R | R | R | R | R | R | R | R | R | R | — | R | R | R |
| 17 | $\overline{\phi_2}$ | O | O | O | — | O | D | — | O | O | D | D | — | — | O | O | D |
| 18 | $\overline{\phi_3}$ | O | O | O | — | O | D | — | O | O | D | D | R | R | R | R | R |
| 19 | $\overline{\phi_1}$ | O | O | R | R | R | R | R | — | O | O | — | D | O | — | O | O | D |

FIG. 6B

CASE III (CLEAR)

| STEP | CLK | 10f | 10e₁ | 21 | 29 | 25 | 32 | 22 | 24 | 26 | 31 | 33 | 23 | 30 | 27 | 34 | 35 |
|---|---|---|---|---|---|---|---|---|---|---|---|---|---|---|---|---|---|
| 21 | $\phi_2$ | O | O | O | — | O | D | R | R | R | R | R | — | — | O | O | D |
| 22 | $\phi_3$ | O | O | O | — | O | D | — | O | R | — | D | R | R | O | O | R |
| 23 | $\phi_1$ | O | O | R | R | R | R | — | O | O | — | D | O | O | R | R | D |
| 24 | $\phi_2$ | O | O | O | O | — | D | R | R | R | — | D | O | O | — | O | D |
| 25 | $\phi_3$ | O | O | O | O | — | D | O | — | O | R | R | R | R | R | R | R |
| 26 | $\phi_1$ | O | O | R | R | R | R | — | O | O | R | D | O | O | — | O | O |
| 27 | $\phi_2$ | O | O | O | O | — | O | O | — | O | O | O | O | O | R | O | O |
| 28 | $\phi_3$ | O | O | O | O | — | R | R | R | R | O | O | R | R | R | R | R |
| 29 | $\phi_1$ | O | O | R | R | R | R | — | O | O | O | O | O | O | — | O | O |

FIG. 6C

JOSEPHSON INTEGRATED CIRCUIT HAVING AN OUTPUT INTERFACE CAPABLE OF PROVIDING OUTPUT DATA WITH REDUCED CLOCK RATE

BACKGROUND OF THE INVENTION

The present invention generally relates to Josephson integrated circuits having a Josephson processor therein, and more particularly to a Josephson integrated circuit having a construction for facilitating the exchange of data between the Josephson processor and peripheral circuits cooperating therewith with a reduced clock rate.

Intensive efforts are in progress to fabricate Josephson integrated circuits. Therein, the Josephson devices, utilizing the Josephson junction of Nb and the like for logic operation, are assembled to form a digital processor. Such Josephson devices are characterized by extremely high operational speed and low power consumption. Thus, the device is particularly suited for constructing ultra-high speed digital computers and processors.

In such a high speed Josephson digital processor, there arises a problem in that, although the operational speed within the processor is enormously high, the speed of processing in the peripheral processors, usually constructed as conventional silicon or compound semiconductor devices, is not as large or high as in the Josephson processor. It should be noted that the Josephson processors utilize the transition between the superconduction state and the normal conduction state of the Josephson junction for logic operation, and because of this, the Josephson processors should be operated at an extremely low temperature environment. Thus, the fabrication of an entire computer or signal processing system by a single Josephson processor is not realistic.

When conventional semiconductor devices are used for the peripheral circuits, the transfer of data between the Josephson processor and the peripheral semiconductor circuits has to be made with a reduced clock rate. Because of this, there is a need to provide a conversion circuit for converting the data output from the Josephson processor to the peripheral processing circuits without undermining or affecting the high speed processing capability of the Josephson processor.

Figure 1:
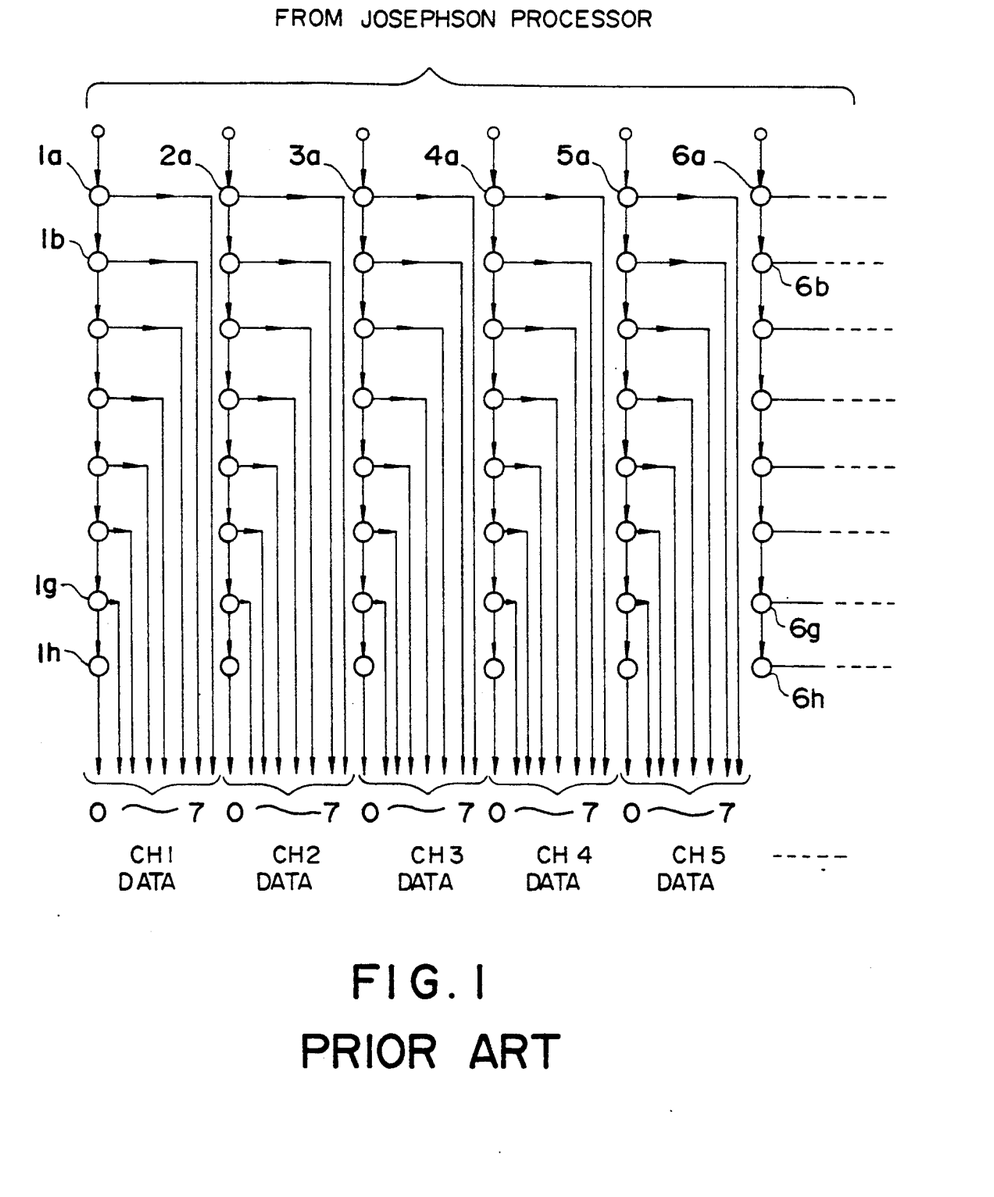
FIG. 1 is a circuit diagram used conventionally for reducing the clock rate when reading data produced in a Josephson processor by a semiconductor processor.

Conventionally, a conversion circuit shown in FIG. 1 has been known for the above-mentioned purpose. The circuit of FIG. 1 is described by Ohara et al., "JOSEPHSON SERIAL-PARALLEL CONVERTER," Extended Abstracts of 1989 International Superconductivity Electronics Conference (ISEC'89), sponsored by the Japan Society of Applied Physics and held Jun. 12–13, 1989 in Tokyo, which is incorporated herein as a reference.

Referring to FIG. 1, the conversion circuit includes shift registers 1a–1h, 2a–2h, 3a–3h, . . . arranged into a number of columns. Each column of the shift registers are connected to a Josephson processor not illustrated. To avoid the complexity in the drawing, the reference numerals are given to only a part of the shift registers.

In each column of the shift registers, there are provided a plurality of shift registers in correspondence to the number of bits of the output data to be obtained from a single bit output of the Josephson processor. Thus, when converting single bit data produced serially from the Josephson processor into eight bit parallel data in each column, there are provided eight shift registers 1a–1h, 2a–2h, . . . in respective columns. In each column, the shift registers, such as the shift register 1a, have respective branched outputs and there are formed a number of eight bit output channels CH1, CH2, . . . at the bottom level of the shift register column.

In operation, the output data from the Josephson processor is written into the shift registers in each column sequentially. For example, the output data is written into the shift register 1a and transferred sequentially along to the registers 1b, 1c, . . . up to the register 1h. In response to this, there appears eight bit parallel data CH1 DATA, CH2 DATA, . . . at the bottom of the shift register column. Thereby, a serial-to-parallel conversion is achieved with a reduction in the clock rate with the ratio of 8 : 1.

In such a serial-to-parallel converter, however, there exists a problem in that the reduction in the clock frequency is determined by the hardware construction, and because of this, a large area is needed for the hardware when one tries to reduce the clock frequency with a large reduction ratio. It should be noted that the number of bits in the converted parallel output data from the converter corresponds to the number of stages of the shift registers provided in each column. Thus, a large number of shift registers are required to reduce the clock rate of the output parallel data.

On the other hand, in the Josephson processor, input or output of data in response to each high speed clock is not always necessary or desirable, as most of such outputs merely represent the intermediate result of a job and do not represent the desired result of the job. Herein, the job is a set of operations performed to achieve a desired result. It is more usual that the input or output occurs sporadically such that the inputting or outputting of data is made only when a set of complete operations (or a job) defined by program, are completed. The duration of the processing for such operation changes job by job from several clocks to several tens of clocks.

The conversion circuit of FIG. 1 is obviously inappropriate from this view point also, as it lacks the flexibility for responding to the variable duration of the operation carried out in the processor. Further, the circuit of FIG. 1 produces unnecessary, intermediate outputs in response to each of the clocks as already noted. Such unnecessary output data inevitably invites increased complexity in the peripheral circuits that are used to process the output data of the Josephson processor. Associated with the increased complexity, the peripheral circuits suffer from various problems such as decreased yield, increased power consumption, increased signal delay time, and the like.

SUMMARY OF THE INVENTION

Accordingly, it is a general object of the present invention to provide a novel and useful integrated circuit having a Josephson processor, wherein the aforementioned problems are eliminated.

Another object of the present invention is to provide a Josephson integrated circuit including therein a Josephson processor for high speed logic operation, wherein data output from the Josephson processor in response to first, high speed clocks is latched in response to a command that signals an end of a set of processing, and is subsequently output in response to second, slower clocks.

Another object of the present invention is to provide a Josephson integrated circuit for performing digital logic operations with the capability of outputting the result of the operations with a reduced clock rate, including: a Josephson logic processor operated at a first clock rate for carrying out a logic operation, the Josephson logic processor producing output data representing a result of the logic operation and a status signal indicating a status of the logic operation; latch means comprising Josephson devices operated at the first clock rate for receiving the output data from the Josephson processor, the latch means being supplied with the status signal from the Josephson processor for holding the output data therein, the latch means being further supplied with a clear signal for clearing the output data therefrom; and data output means comprising Josephson devices operated at a second clock rate that is slower than the first clock rate, the data output means having an output terminal and supplied with the output data held in the latch means for passing the output data to the output terminal in response to the second clock, the data output means producing the clear signal in response to the second clock.

According to the present invention, only output data that is produced upon completion of a predetermined logic operation, is output with a reduced rate in response to the status signal. Whenever the data is output, the latch means is cleared in response to the clear command for the next operation. Thus, the reduction in the clock rate achieved by the present invention is not related to the number of hardware components and the integrated circuit can be constructed compactly. More importantly, the output of the data is made only in response to the completion of the predetermined logic operation procedure in the Josephson processor and thereby a flexible outputting of data from the Josephson processor is achieved while fully exploiting the high speed characteristic of the Josephson device.

Other objects and further features of the present invention will become apparent from the following detailed description when read in conjunction with the attached drawings.

DETAILED DESCRIPTION

Figure 2:
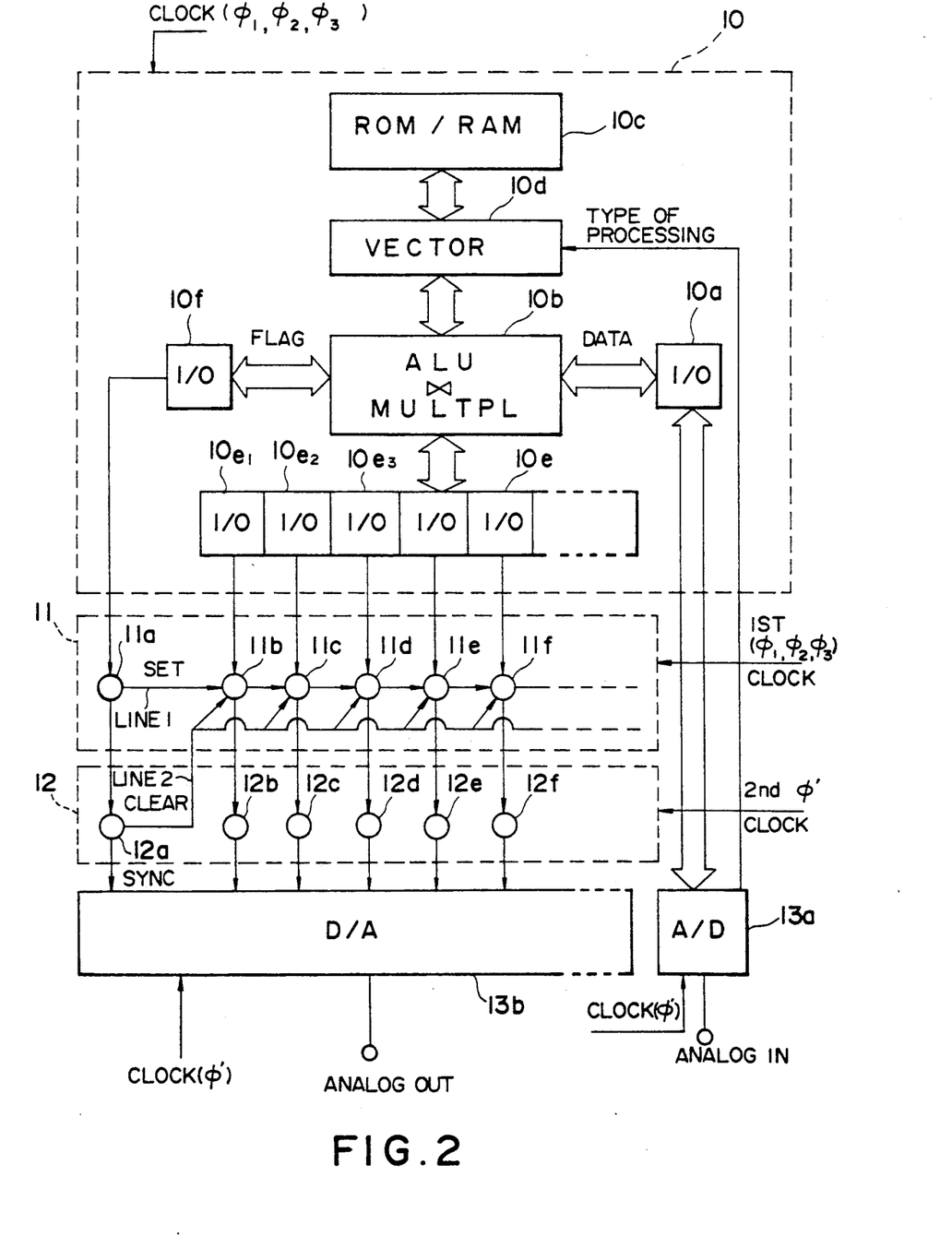
FIG. 2 is a block diagram showing the general construction of the Josephson integrated circuit according to the present invention.

FIG. 2 shows the general construction of the Josephson integrated circuit according to an embodiment of the present invention. In the present embodiment, an analog input signal such as a video signal is processed by a Josephson processor and subsequently output as an analog output signal. Of course, the present invention is not limited to such processing of analog signals.

Referring to FIG. 2, the Josephson integrated circuit generally comprises a Josephson processor 10, a latch circuit 11, and an output interface circuit 12. The Josephson processor 10 is given input digital data from an analog-to-digital (A/D) converter 13a to which an input video signal is supplied, and carries out a predetermined operation in accordance with a program stored in a memory unit that is provided in the processor 10. The Josephson processor 10 may be the one described by Kotani et al., "A 1 GOPS 8b Josephson Digital Signal Processor," 1990 IEEE International Solid-State Circuits Conference, Digest of Technical Papers, pp. 148-286, Thursday, Feb. 15, 1990, which is explicitly incorporated herein as reference.

More specifically, the Josephson processor 10 includes an input port 10a to which the data from the A/D converter 13a is supplied, a logic processing unit 10b supplied with the input data from the input port 10a for processing the data by performing fundamental arithmetic and multiplication operations in accordance with a program, a memory unit 10c including a read-only memory and a random-access memory for storing programs and other data, and a control unit 10d supplied with a command specifying the type of the operation to be carried out from the A/D converter 13a for selectively reading out the program stored in the memory unit 10c. Further, the Josephson processor 10 includes therein a register 10e forming a number of output ports 10e1, 10e2, 10e3, ... for outputting the data processed by the logic processing unit 10b, and another output register 10f for outputting a control signal indicating completion of a predetermined logic operation carried out in the memory unit 10c.

In operation, the Josephson processor 10 is clocked by three-phase clocks ($\phi 1$, $\phi 2$, $\phi 3$) having a clock frequency of 1 GHz or more, and produces output data at the output register 10e. In a typical example, a clock frequency of 2 GHz is used. It should be noted that the output data at the output register 10e includes an intermediate result of processing that is not necessary for the processing circuits that uses the output of the Josephson processor 10.

When a predetermined set of operations (or a job) are completed in the logic processing unit 10b, the unit 10b produces a flag indicating the completion of the job. Thereby, the flag is supplied to the output register 10f and the control signal is output from the output port 10f indicating that output data is ready for transfer at the output ports 10e1, 10e2, 10e3, ...

Thus, the output data of the Josephson processor 10 is given sporadically, not continuously, in response to the completion of each job.

In the present invention, such a sporadical nature of the output is utilized to reduce the clock rate by using the latch circuit 11 and the output interface circuit 12.

Referring again to FIG. 2, the latch circuit 11 comprises a number of Josephson circuits 11a, 11b, 11c, ... clocked by three-phase clocks $\phi 1$, $\phi 2$, $\phi 3$ that are the same clocks used to drive the Josephson processor 10. The circuits 11b, 11c, ... are latch devices forming a data latch part provided in correspondence to the respective output ports 10e1, 10e2, ... and hold the output data as will be described later in detail, while the Josephson circuit 11a the control part of the latch circuit is connected to the output port 10f and supplied with a control signal from the logic processing unit 10b via the output port 10f. In response to the control signal, the Josephson circuit 11a produces a set command signal "SET" that is supplied to the circuits 11b, 11c, ... acting as latch devices, simultaneously via a line LINE1. Thereby, holding of the output data is made in the latch devices or data latch part 11b, 11c, ...

To the latch circuit 11, the output interface circuit 12 is connected. The output interface circuit 12 comprises Josephson circuits 12a, 12b, ..., wherein the Josephson circuits are connected to corresponding Josephson circuits 11a, 11b. In contrast to the case of the latch circuit 11, the Josephson circuits in the output interface circuit 12 are operated in response to a second clock $\phi'$ that has a second frequency substantially lower than the first frequency. In a typical example, a second clock frequency of 70 MHz is used.

It should be noted that the Josephson circuit 12a the control part of the output interface circuit is connected to the Josephson circuit 11a and takes over the data held in the circuit 11a in response to the second clock. Simultaneously to the transfer of the data from the circuit 11a to the circuit 12a, the output data held at the Josephson latch devices 11b, 11c, ..., are transferred to the Josephson circuits or data holding part 12b, 12c, ..., and held therein. Further, the data held at the Josephson circuits 12b, 12c, ... are supplied to an external semiconductor processor 13b that is operated also in response to the second clock $\phi'$. In the present example, the semiconductor processor 13b is a digital-to-analog converter for converting the digital data supplied thereto into an analog output data. Further, the Josephson circuit control part of the output interface circuit 12a produces a clear command signal "CLEAR" in response to the holding of the data at the Josephson circuits data holding part 12b, 12c, ..., and the command signal CLEAR is sent to the Josephson latch devices 11b, 11c, via a line LINE2. Thereby the Josephson circuits or data latch part 11b, 11o, ... are cleared for the next latching operation.

Summarizing the foregoing operation, when there is formed output data of the Josephson processor 10 in response to a completion of a job, the output data is transferred to the latch circuit 11 operated at the same clock rate as the Josephson processor, in response to the flag set at the output port 10f. In the latch circuit 11, the output data is held in response to the SET command and waits for transfer to the output interface circuit 12 that is operated at the reduced clock rate. The data held at the Josephson circuits forming a data latch part 11b, 11c, ..., are transferred, in due course, to the corresponding Josephson circuits forming a data holding part 12b, 12c, ... at the second, reduced clock rate. When the transfer of the data is made, the latch circuit 11 is cleared in response to the CLEAR command provided by the Josephson circuit 12a. Thereby, it becomes possible to read the output data of the Josephson processor 10 by the semiconductor processor at a reduced clock rate.

In the foregoing construction, it should be noted that the appearance of the flag at the output port 10f is not periodical but changed each operation by the Josephson logic processing unit 10b. The construction of the present invention has the flexibility to respond to such a sporadic occurrence of output and is particularly suited for taking output from Josephson processors.

Next, a more detailed description will be made on the construction of the latch circuit 11 and the interface circuit 12. As the Josephson circuits 11b–11f have an identical construction with each other, and as the Josephson circuits 12b–12f also have an identical construction with each other, only a part of the circuits 11 and 12 in which the Josephson circuits 11a, 12a, 11b and 12b are included, will be described.

Figure 3:
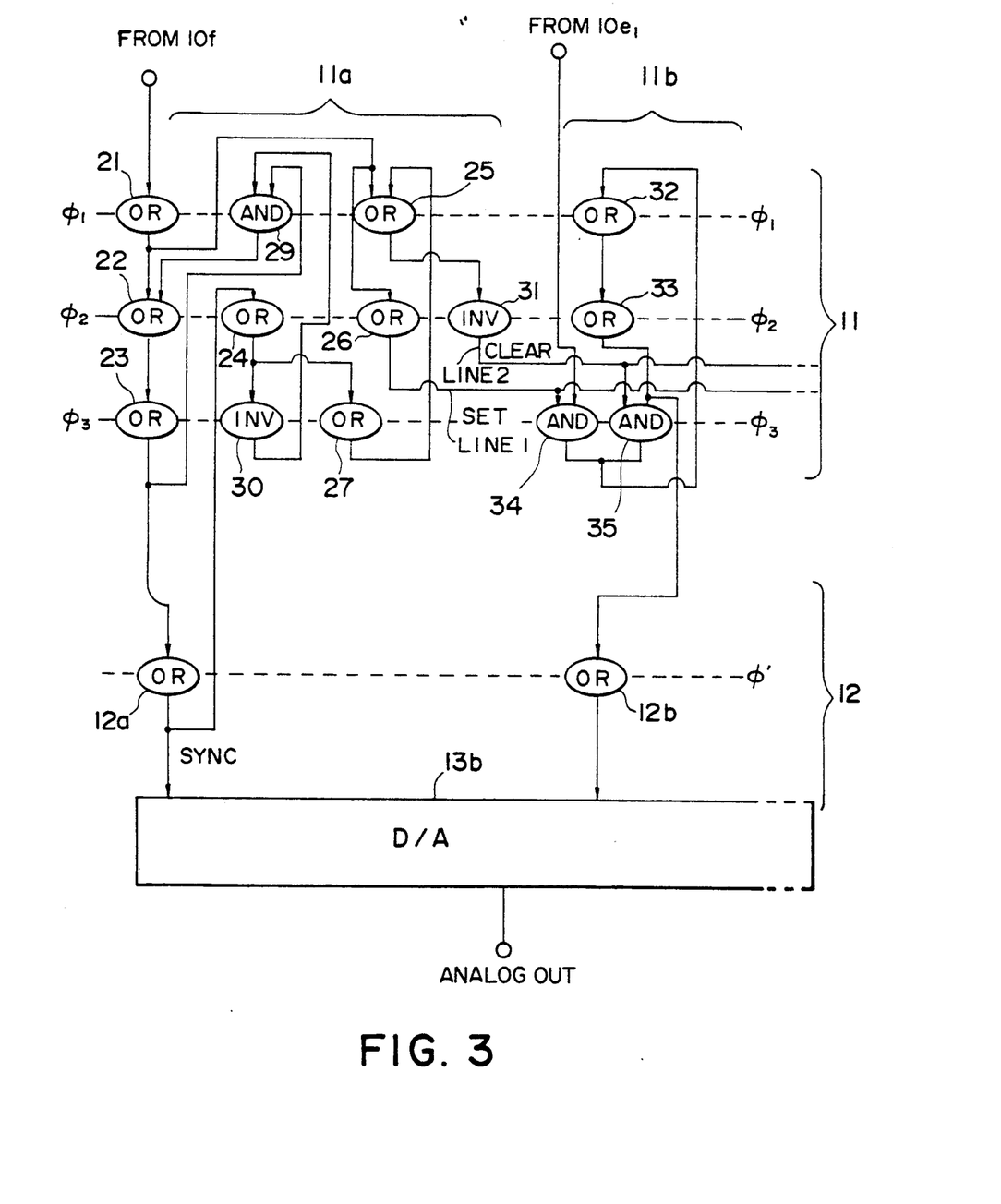
FIG. 3 is a circuit diagram of the essential part of the block diagram of FIG. 2.
Figure 4:
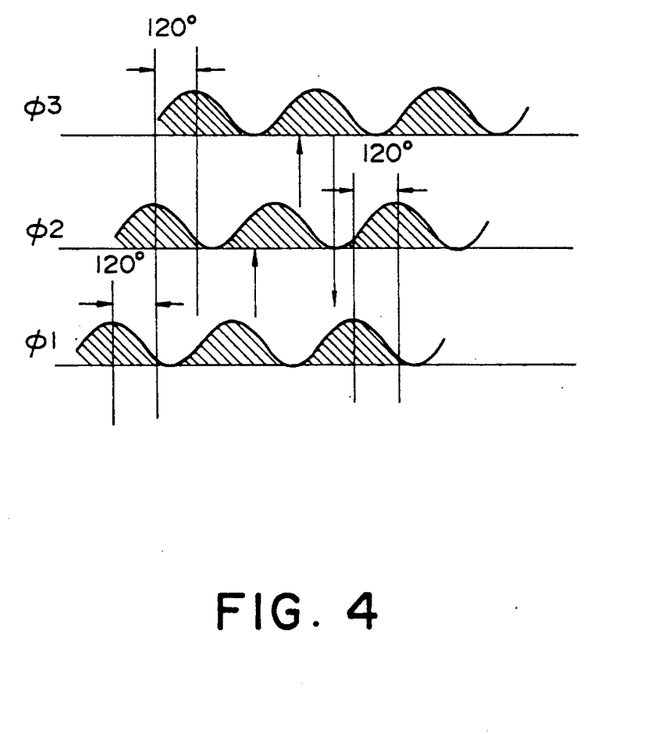
FIG. 4 is a diagram showing the waveform of the typical three-phase clocks used to drive the Josephson devices in the circuit of FIG. 2.

Referring to FIG. 3, the Josephson latch circuit 11a includes therein Josephson OR gates 21 and 25 and a Josephson AND gate 29, all driven in response to a clock signal $\phi 1$ that forms a first phase signal of the first three-phase clocks $\phi 1$, $\phi 2$, $\phi 3$) (FIG. 4). Similarly, there are provided Josephson OR gates 22, 24 and 26 and a Josephson inverter 31, all driven in response to a signal $\phi 2$ that forms a second phase signal of the first three-phase clocks $\phi 1$, $\phi 2$ and $\phi 3$. Further, there are provided Josephson OR gates 23 and 27 and a Josephson inverter 30 all driven in response to a signal $\phi 3$ that forms a third phase signal of the first three phase clocks $\phi 1$, $\phi 2$ and $\phi 3$.

The circuit elements or gates 21 and 26 collectively form a control signal transfer part located in the control part 11a of the latch circuit. The circuit elements or gates 21, 224, 23 and 29 collectively form a control signal latch part located in the control part 11a of the latch circuit. The circuit elements 24, 25, 27, 29, 30 and 31 collectively form a clear control part located in the control part 11a of the latch circuit. The circuit elements 32, 33, 34 and 35 collectively form a data latch part 11b–11f of the latch circuit.

The Josephson circuit 11b, on the other hand, includes a Josephson OR gate 32 driven in response to the clock $\phi 1$, a Josephson OR gate 33 driven in response to the clock $\phi 2$ and Josephson AND gates 34 and 35 that are driven in response to the clock $\phi 3$.

It should be noted that the three-phase clocks used to drive the foregoing Josephson gates are well known and comprise the three sinusoidal signals having a phase that is shifted with each other by 120 degree phase angles as shown in FIG. 4. Thus, when one of the sinusoidal signals has the low level state, the other two sinusoidal signals have the high level state. Thereby, the Josephson gates that are driven in response to the first sinusoidal signal are reset while the other Josephson gates that are driven in response to the other two sinusoidal signals are activated.

Figure 5A:
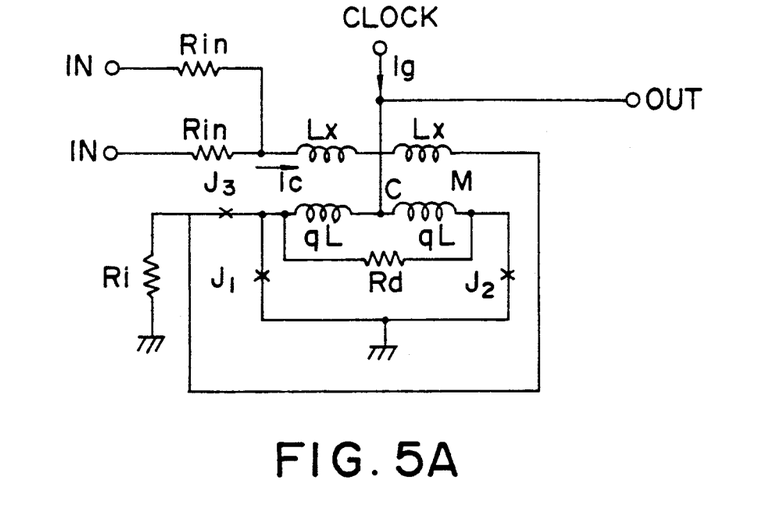
FIGS. 5A-5C are circuit diagrams showing various logic devices used in the circuit of FIG. 3.

FIG. 5A shows a circuit diagram of a Josephson OR circuit described previously by Fujimaki et al., "Josephson Modified Variable Threshold Logic Gates for Use in Ultra-High-Speed LSI," IEEE Transactions on Electron Devices Vol. 36, No. 2, February 1989, which is explicitly incorporated herein as reference. The OR gate forms an asymmetric interferometer and includes therein Josephson junctions J1 and J2, wherein the Josephson junction J1 has a critical current pIm while the Josephson junction J2 has a critical current qIm. Here, there holds a relation $p+q=1$. Further, there is included an inductance L that is divided into a left branch having an inductance qL (designated hereinafter as "inductance qL") and a right branch having an inductance pL (designated hereinafter as "inductance pL"), wherein the branch qL has an end connected to the ground via the Josephson junction J1, and the branch pL has an end connected to the ground via the Josephson junction J2. The other end of the branch qL and the other end of the branch pL are connected each other at a central node C, to which the clock signal is supplied as a bias current Ig. Further, there is provided an inductance Lx to establish a magnetic coupling with the branches qL and pL via a mutual inductance M. The inductance Lx has an end connected to one or more input terminals for receiving an input current Ic and another end connected via a third Josephson junction J3 to the inductance qL at the end that is connected to the ground via the Josephson junction J1.

In operation, the Josephson junctions J1–J3 are all in the superconduction state in the initial state wherein the level of the clock signal is set at zero. Thereby, the bias current Ig flows to the ground directly with the increased level of the clock signal and there appears a low or zero-volt output at an output terminal OUT connected to the node C. The Josephson junctions J1–J3 remain in the turned on state as long as there is no input current Ic even when the clock signal has turned to the high level state.

When the current flowing through the Josephson junctions J1 and J2 has exceeded a predetermined threshold as a result of the increase in the input current Ic, on the other hand, the Josephson junctions J1 and J2 cause a transition to the turned-off state. Thereby, the bias current Ig starts to flow through the Josephson junction J3 to the ground, after flowing through registers Rin, and in response to this, the Josephson junction J3 is turned off. As a result, a high output is obtained at the output terminal. Obviously, the transition of the state of the output is caused in response to the sum of the input current at the input terminals IN, and thus, the circuit of FIG. 5A operates as a logic sum or OR-circuit. More detailed analysis of the circuit of FIG. 5A can be found in the foregoing reference by Fujimaki et al. In the circuit of FIG. 3, only one input terminal is employed.

Figure 5B:
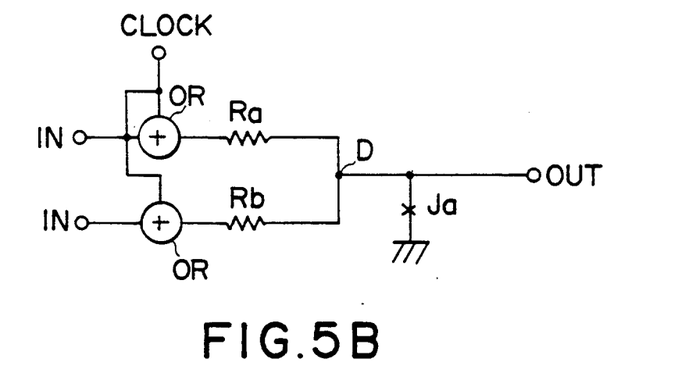

FIG. 5B shows a construction of a Josephson AND gate used in the circuit of FIG. 3.

Referring to FIG. 5B, the AND gates comprises input terminals IN connected to each other at a node D via an OR gate described in FIG. 5A and a Josephson junction Ja that shunts the node D to the ground. In the drawing, the OR gates are shown by a symbol "+" and driven in response to the clock as already described. The output of the gate is obtained at an output terminal connected to the node D. When the OR gates are reset by the low level state of the clock, the AND gate is of course reset.

In operation, the Josephson junction Ja is designed to have a threshold current of transition from the superconduction state to the normal conduction state such that the transition occurs only when there are input currents at both input terminals IN in FIG. 5B. Thereby, the circuit produces a logic product of the input logic signals. More complete description of the Josephson AND gate can be found in the foregoing article by Fujimaki et al.

Figure 5C:
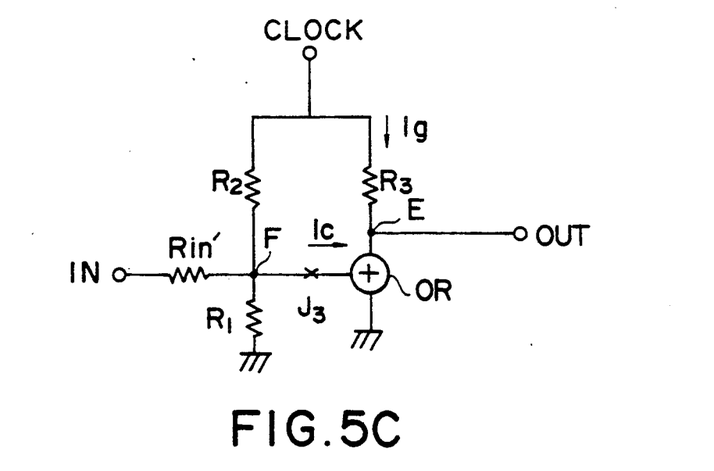

FIG. 5C shows the inverter circuit used in the circuit of FIG. 3. The inverter circuit of FIG. 5C is a timed-inverter circuit and comprises an OR gate represented by the symbol "+." The OR gate is driven by the clock current Ig in response to the clock signal CLOCK that is supplied to the OR gate via a resistor $R_3$ and reset periodically by the low level state of the clock. Further, the clock signal is voltage-divided by resistors R1 and R2 and supplied to the OR gate via a Josephson junction $J_3$ from a node F that is formed at a junction between the resistor R1 and the resistor R2. Further, an input signal is supplied to the OR gate via the node F. For this purpose, an input terminal IN is connected to the node F via a resistor Rin'.

In operation, when the current flowing from the node F to the OR gate is below a critical current level Ic in response to the no-input current state at the input terminal IN, the current supplied to the OR gate in response to the clock signal maintains the output of the OR gate at a high level state. On the other hand, when there is an input current at the input terminal IN, the current supplied from the node F to the OR gate exceeds the critical current Ic and the Josephson junction $J_3$ is turned off in response thereto. Thereby, the input current to the OR gate disappears and the output of the OR gate, obtained at a node E between the OR gate and the resistor $R_3$, changes to the low level state. Thus, an inversion of the input logic signal is obtained at an output terminal OUT connected to the node E.

Next, the latch circuit 11 of FIG. 3 will be described in detail. It should be noted that, in the foregoing FIG. 3, a number of logic gates described with reference to FIGS. 5A–5C are connected to form the Josephson circuit 11a and the Josephson latch device 11b.

It should be noted that the purpose of the Josephson circuit 11a is to produce the set command SET on the line LINE1 in response to the control signal from the output port 10f of the Josephson processor 10 and to produce the clear command CLEAR on the line LINE2 in response to the transfer of the output data from the Josephson latch device 11b to the Josephson circuit 12b. On the other hand, the purpose of the Josephson circuit 11b is to hold the output data from the output port 10el of the Josephson processor 10 in response to the set command SET on the line LINE1 and to clear the output data held therein in response to the clear command CLEAR on the line LINE2.

Next, the construction of the Josephson circuit 11a, the control part of the latch circuit, will be described.

Referring to FIG. 3, there is provided an OR gate 21 having an input terminal to which the control signal from the output port 10f is supplied. As already noted, the control signal is produced in response to the flag sent from the logic processing unit 10b to the output port 10f at each end of the job. The gate 21 is driven in response to the clock $\phi 1$ and has an output terminal connected to an input terminal of another OR gate 22 that is driven by the clock $\phi 2$. Further, the output terminal of the gate 21 is connected to an input terminal of an OR gate 25 that is driven by the clock $\phi 1$. The OR gate 22 has an output terminal that is connected to an input terminal of an OR gate 23 that is driven in response to the clock $\phi 3$. The OR gate 23, on the other hand, has an output terminal connected to an input terminal of an AND gate 29 that is driven in response to the clock $\phi 1$. The AND gate 29, in turn, has an output terminal connected to another input terminal of the OR gate 22.

The output terminal of the OR gate 23 is further connected to an input terminal of the Josephson circuit 12a which comprises an OR gate 12a shown in FIG. 5A. The OR gate 12a has an output terminal connected to the D/A converter 13b, and the output terminal is further connected to an input terminal of an OR gate 24 that is driven in response to the clock $\phi 2$. The OR gate 24, in turn, has an output terminal connected to an input terminal of an inverter 30 that is driven in response to the clock $\phi 3$. Further, the output terminal of the OR gate 24 is connected to an input terminal of an OR gate 27 that is driven in response to the clock $\phi 3$. The inverter 30 has an output terminal connected to another input terminal of the AND gate 29, and the OR gate 27 has an output terminal connected to another input terminal of the OR gate 25. Further, there is provided an OR gate 26 driven in response to the clock $\phi 2$ having an input terminal connected to the output terminal of the OR gate 21.

The OR gate 26 has an output terminal connected to the line LINE1 and outputs thereon the set command SET in response to the control signal that is output from the OR gate 21 from the output register 10f. On the other hand, the OR gate 25 has an output terminal connected to an input terminal of an inverter 31, and the inverter 31 has an output terminal connected to the line LINE2. Thereby, the clear command CLEAR is output on the line LINE2 in response to the transfer of the control signal to the OR gate 12a.

The latch device 11b comprises an AND gate 34 driven in response to the clock $\phi 3$. The AND gate 34 has a first input terminal to which the line LINE1 is connected and a second terminal connected to the output register 10e1 of the Josephson processor 10. Further, the AND gate 34 has an output terminal connected to an input terminal of an OR gate 32 that is driven in response to the clock $\phi 1$. The OR gate 32 has an output terminal connected to an input terminal of an OR gate 33 driven in response to the clock $\phi 2$. The OR gate 33 in turn has an output terminal connected to an input terminal of an AND gate 35 that is driven in response to the clock $\phi 3$. Further, the AND gate 35 has another input terminal to which the line LINE2 is connected and an output terminal that is connected, commonly with the output terminal of the AND gate 34, to the input terminal of the OR gate 32. Further, the output terminal of the OR gate 33 is connected to the Josephson circuit 12b that is formed from an OR gate 12b. The OR gate 12b, in turn, has an output terminal connected to the D/A converter 13b.

Next, the operation of the circuit of FIG. 3 will be described with reference to FIGS. 6A-6D showing a time-sequential transition of state of the logic gates used in the circuit.

Figure 6A:
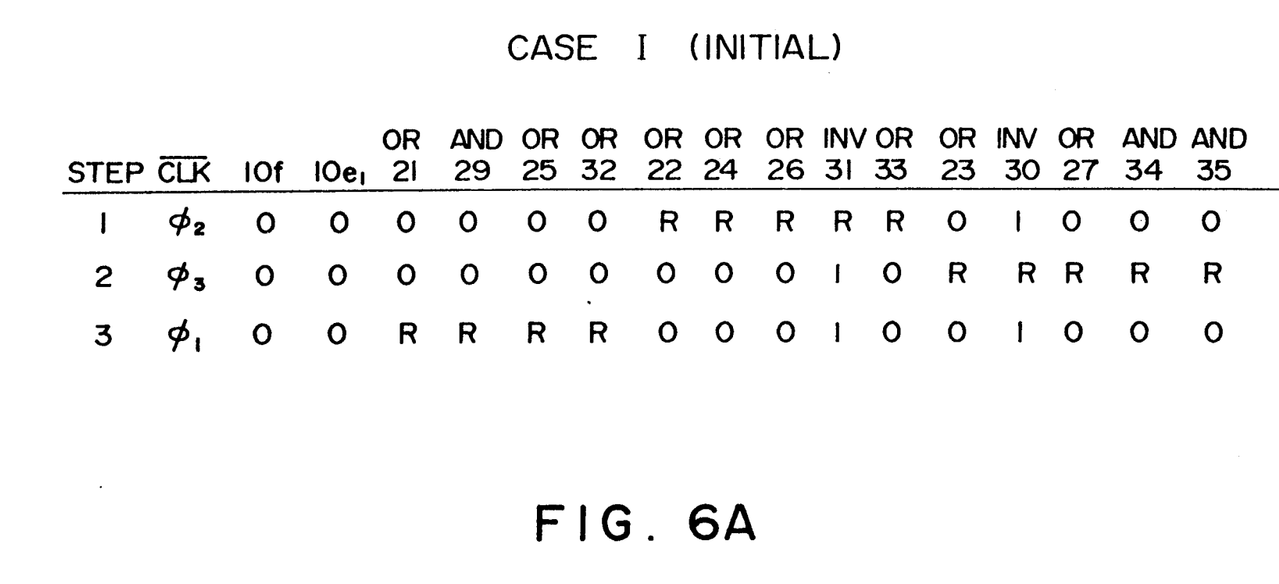
FIGS. 6A-6C are diagrams showing the transition of state of the logic devices in the circuit of FIG. 3, carried out respectively in response to the initial state of operation, latching operation and clearing operation.

First, the latching operation of the latch device 11b at an initial state will be examined with reference to FIG. 6A. In the operation of FIG. 6A, it is assumed that the output interface circuit 12 is not activated. In other words, there is no output from the OR gate 12a forming the output interface circuit 12 to control the OR gate 24. In other words, the outputs of the OR gate 24 and 27 are held at the low level state throughout the steps, and the output of the inverter 30 is held always at the high level state unless it is reset. The case where the data is transferred to the output interface circuit 12 will be described later with reference to FIG. 6C.

In the initial state, all the OR gates in FIG. 3 are cleared. Thereby, there appear three distinct states sequentially, in response to the three phase clocks $\phi 1$, $\phi 2$, $\phi 3$ as shown in FIG. 6A.

Referring to the drawing, in a first step, STEP 1, corresponding to the low level state of the clock $\phi 2$, the OR gates and inverter 22, 24, 26, 31 and 33 are all reset ("R") in response to the clock $\phi 2$. Further, the OR gates 21, 25, 32, 23 and 27 assume a low level state ("0") and associated therewith, the inverter 30 assumes the high level state ("1") as already noted, and the AND gates 34 and 35 assume the low level state ("0").

In a next step, STEP 2, the OR and AND gates 23, 27, 34 and 35 and the inverter 30 are reset in response to the low level state of the clock $\phi 3$, and the outputs of all other OR gates and AND gates, except for the inverter 31, assume the low level state. In response to the high level state of the output of the inverter 31, the initial data 0 is held in the latch device 11b as will be explained later with reference to FIG. 6B. It should be noted that the inverter 31 is connected to the LINE2 and thereby the output of the inverter 31 acts as a control signal for holding the data in the latch device 11b.

In a next step, STEP 3, the OR and AND gates 21, 25, 29 and 32 are all reset in response to the low level state of the clock $\phi 1$, while the outputs of all other OR gates and AND gates, except for the inverters 30 and 31, assume the low level state. Again, the output of the inverter 30 indicates that the interface circuit 12 is not yet activated to read the data, and the output of the inverter 31 indicates that the data is held in the latch device 11b.

Further, the foregoing STEPS 1-3 are repeated in response to the clocks $\phi 1$, $\phi 2$ and $\phi 3$. It should be noted that during this initial state, the processing in the Josephson processor 10 is in progress, and there is no flag set at the output port 10f, nor output data D at the output port 10e1.

Figure 6B:
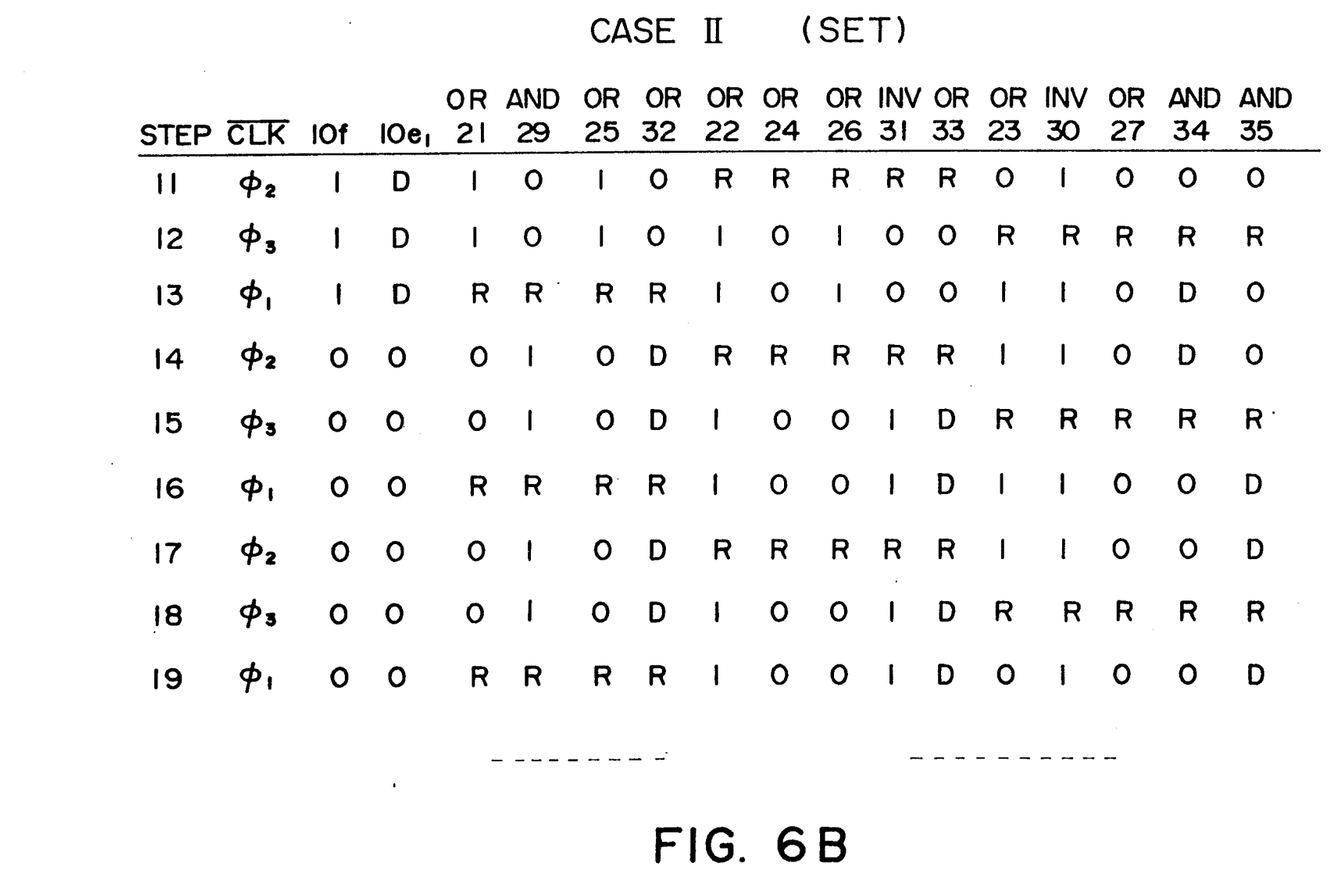

Next, the operation for the case when the flag is set at the output port 10f and the output data D set at the output port 10e1 shown in FIG. 2 will be described with reference to FIG. 6B. In response to the flag, the output port 10f outputs the control signal having a high level, and this high level signal is taken over or received by the OR gate 21, and the data at the output port 10e1 is taken over by the AND gate 34 in response to the set command SET on the LINE1. In FIG. 6B, it is assumed that the control signal is not yet transferred to the OR gate 12a. In other words, it is assumed that, in FIG. 6B, only the operation for the case where the output data of the Josephson processor 10 is held in the latch circuit 11 will be considered. Associated therewith, the output of the inverter 30 is always held at 1 and the output of the OR gate 27 is always held at 0 unless they are reset.

Referring to FIG. 6B, in the first step, STEP 11, corresponding to the low level state of the clock $\phi 2$, the output register 10f of the Josephson processor 10 produces the high level control signal in response to the completion of the operation therein. Here, it is assumed that the STEP 11 is the step that follows STEP 3 of FIG. 6A. Further, the output data D produced as a result of the operation is held at the output register 10e1. The data may be either 1 or 0, depending on the result of the processing. In response to this, the OR gate 21 is driven by the clock $\phi 1$ and overtakes or receives the output of the register 10f. Thereby, the output level of the gate 21 is changed to the high level state. Further, the output of the gate 21 is supplied to the OR gate 25 and sets the output thereof at the high level state. It should be noted that the gate 21 and the gate 25 are driven by the same clock $\phi 1$. On the other hand, the OR gates 22, 24, 26, 33 are all reset, and the inverter 31 is also reset. The inverter 30 produces the high level output in response to the low level output of the OR gate 24. As already described, it should be noted that the OR gate 24 is controlled in response to the output of the OR gate 12a in the interface circuit 12 in FIG. 3. The output of the inverter 30, in turn, is used to activate the AND gate 29 such that the gate 29 allows the passage of input signal therethrough. In other words, the gate 29 allows the passage of the input signal as long as there is no high level input to the OR gate 24 from the OR gate 12a and unless reset.

In a next step, STEP 12, corresponding to the low level state of the clock φ3, the output of the OR gate 21 is transferred to the OR gate 22 to cause the transition of the output from the low level, reset state to the high level state. It should be noted that, in the STEP 12, the clocks φ1 and φ2 both assume the high level state and thereby the transfer of the data occurs successfully from the gate 21 to the gate 22.

Further, the output of the OR gate 24 is held at the low level state, the output of the inverter 31 is held at the low level state, the output of the OR gate 33 is held at the low level state, and the output of the AND gate 29 is held at the low level state because of the low level input thereto.

In the STEP 12, the high level output of the gate 21 is further transferred to the OR gate 26 and causes the transition of the output from the low level, reset state to the high level state. It should be noted that the output of the gate 26 is connected to the LINE 1 and thus, the set command SET is output on the LINE 1 in response to the high level state of the OR gate 26. It should also be noted that, in the STEP 12, the gates 23, 27, 30, 34 and 35 are all reset.

In the next step, STEP 13, the OR gates 21, 25 and 32 are all reset and the AND gate 29 is reset also. Further, the OR gates 22, 24 and 26 and the inverter 31 maintain the same state as in the STEP 12. Further, the output of the OR gate 22 is transferred to the OR gate 23 and the output of the gate 23 causes a transition to the high level state. Further, the AND gate 34 is activated by the high level output of the OR gate 26 and thereby the data D at the output register 10el of the Josephson processor 10 is transferred to the AND gate 34 (shown by the letter "D" in FIG. 6B). In other words, the output data D is transferred to the latch device 10el in response to the set command SET on the LINE 1. On the other hand, the AND gate 35 is disabled in response to the low level output of the inverter 31 that is caused in turn in response to the high level state of the OR gate 25. The output of the OR gate 27 is held at the low level state.

In the next step, STEP 14, the gates 22, 24, 26, 31 and 33 are all reset. Further, the OR gate 23 maintains the high level state. Thereby, the output of the gate 23 is transferred to the gate 29 to set the output of the gate 29 at the high level state. Further, there remains the low level output at the output register 10el and thereby the outputs of the OR gates 21 and 25 assume the low level state. However, the output of the gates 21 and 25 do not cause any change in the operation of the circuit, as the gates that are connected to the output of the foregoing gates are reset.

More importantly, in the STEP 14, the data held at the AND gate 34 is transferred to the OR gate 32 ("D" in FIG. 6B) in the latch device 11b in FIG. 3. Thereby, the data D is held in the device 11b even when the gate 33 is reset in this step. In this step, the output of the inverter 31 is low in response to the resetting thereof, and thus, the AND gate 35 remains disabled. On the other hand, the AND gate 34 is disabled in response to the resetting of the OR gate 26. In other words, the set command SET is cleared in this step. Further, the state of the gates 24, 27 and 30 remains unchanged.

In the next step, STEP 15, the output registers 10f and 10el are cleared after one clock cycle. Further, the gates 23, 27, 30, 34 and 35 are all reset while the output data D is held at the OR gates 32 and 33. Further, the output of the OR gate 25 is previously in the low level state. Thereby, the inverter 31 now produces a high level output on the LINE 2 indicating the holding operation of the latch device 11b. When the signal on the LINE 2 is low, the holding operation of the latch device 11b is cleared as will be described later with reference to FIG. 6C. Because of this reason, the signal on the LINE 2 is designated as /CLEAR indicating the logic inversion of the clear command. In the state of FIG. 6B, it should be noted that other logic gates in the circuit are all cleared.

Further, it should be noted that the high level state of the AND gate 29 is transferred to the OR gate 22. In other words, the control signal from the output register 10f is now held in the AND gate 29 and the OR gate 22.

In the next step, STEP 16, the output of the inverter 31 is held at the high level state, indicating the continuous existence of the /CLEAR command on the LINE 2. Further, the output data D is now held by the OR gate 33 and the AND gate 35 that is activated in response to the /CLEAR command. On the other hand, the gates 21, 25, 29 and 32 are all cleared. Further, the output of the gates 24, 26, 27 and 34 are all in the low level state. Further, the inverter 30 produces the high level output because of no input to the OR gate 24 from the interface circuit 12. In addition, the high level control signal in the OR gate 22 is now transferred to the OR gate 23 and both the gates 22 and 23 hold the high level state. Thereby, the gates have the state identical with the STEP 3 of FIG. 6A except for the OR gate 33 and the AND gate 35 that hold the data D and that the high level control signal is held in the OR gates 22 and 23.

Further, it should be noted that the high level control signal is now held by the OR gate 22 and the OR gate 23.

In the next step, STEP 17, the gates in the circuit assume the state identical with the STEP 11 or STEP 1 in FIG. 6A except for the AND gate 35 and the OR gate 32 and except for the control signal is latched in the OR gate 23 and the AND gate 29. Further, in the next step, STEP 18, a state identical with the state of the STEP 2 of FIG. 6A appears except for the gates 32 and 33 that hold the data D and except for the gates 22 and 29 that hold the control signal.

In the next step, STEP 19, the state of the STEP 15 appears again, and the STEP 16, STEP17 and STEP 18 are repeated until there is given a control signal from the OR gate 12a in the interface circuit 12. Thereby, the output data D of the Josephson processor 10 is held dynamically by the gates 32, 33 and 35, while the high level control signal indicating the completion of the processing is held dynamically by the gates 22, 23 and 29.

Next, the operation of the latch circuit 11 for clearing the latching operation in response to the control signal from the OR gate 12a in the interface circuit 12 will be described with reference to FIG. 6C. As the outline of the operation of the circuit of FIG. 3 is already described with reference to FIG. 6B, only essential features will be described.

Figure 6C:
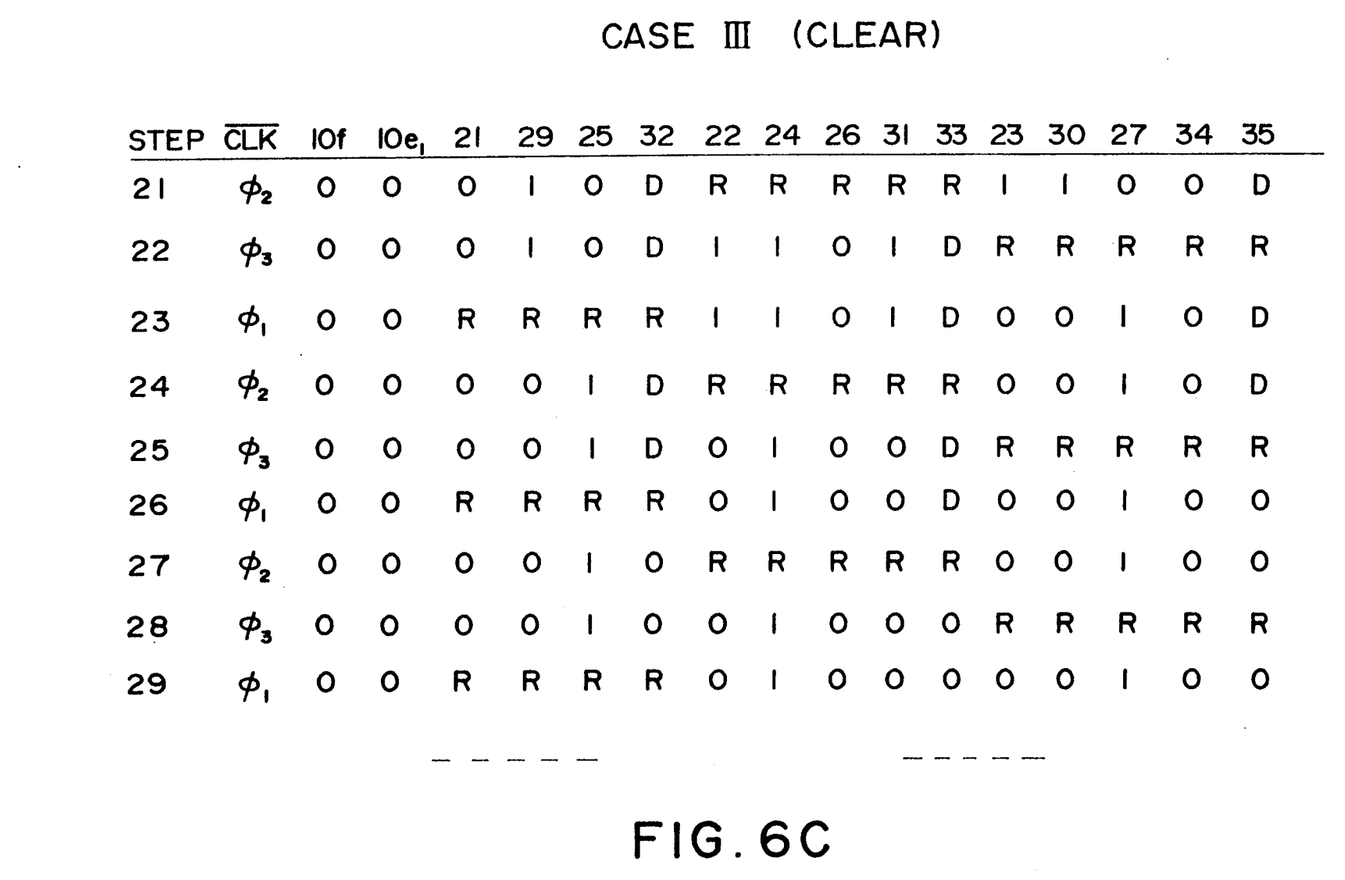

Referring to FIG. 6C, the first step, STEP 21, corresponds to the STEP 17 of FIG. 6B showing the state in which the data D is held in the latch device 11b under the condition that there is no input signal to the OR gate 24 from the output interface circuit 12.

In the next step, STEP 22, the OR gate 12a and the OR gate 12b are activated in response to the second, slower clock φ', and thereby the high level control signal held by the gates 22, 23 and 29 is transferred to the OR gate 12a, passing through the gate 23. Simultaneously, the data D held by the gates 32 and 33 and is transferred to the OR gate 12b, passing through the gate 35. It should be noted that the second clock $\phi'$ may have the clock frequency of 70 MHz for example, and such transfer of the data from the latch circuit 11 to the output interface circuit 12 is achieved without difficulty.

When the high level control signal is transferred to the OR gate 12a, the output of the gate 12a is changed to the high level state. Thereby, in a STEP 22 of FIG. 6C, there occurs a transition in state of the output of the OR gate 24 to the high level state. The transition in turn causes a transition in the output of the inverter 30 from the high level state to the low level state and a transition in the output of the OR gate 27 from the low level state to the high level state in a STEP 23 next to or following STEP 22.

When the output of the inverter 30 is changed to the low level state, the AND gate 29 is disabled and the dynamic holding of the high level control data in the gates 22, 23 and 29 is canceled in the STEPs 24 and 25. Further, the high level output of the OR gate 27 causes the transition of state in the output of the OR gate 25 from the low level state to the high level state in the STEPs 24 and 25. Thereby, the transition of state occurs in the inverter 31 from the high level state to the low level state in STEP 25, and thereby the signal on the LINE 2 is cleared. When this occurs, the AND gate 35 is disabled in a STEP 26 and the dynamic holding of the data D by the gates 32, 33 and 35 is canceled.

After the STEP 26, the states of STEPS 27 and 28 appear as shown in FIG. 6C and the states of the STEPs 25–27 appear repeatedly. In due course, the second clock $\phi'$ is cleared, and the output of the OR gate 24 and the OR gate 27 are cleared. Thereby, the output of the inverter 30 is set at the high level and the latch circuit 11 waits for the next appearance of the control signal and the data D at the output registers 10f and 10e1.

The foregoing description holds true for other latch devices 11c, 11d, ..., and the description for those will not be repeated. Further, it should be noted that substantially the same operation is achieved even when the timing of appearance of the control signal and the data at the output registers 10f and 10e is different with respect to the timing of the three phase clocks. As the derivation of the operation for such cases can easily be made by modifying the foregoing analysis, the description of operation for such cases will be omitted.

When the control signal is transferred to the OR gate 12a together with the simultaneous transfer of the data held in the latch device 11b to the OR gate 12b, the output interface circuit 12a is ready for outputting the result of processing in the Josephson processor 10. Thus, the control signal is outputted to the D/A converter 13b running at the second clock rate as a synchronization signal SYNC and the data at the OR gate 12b is inputted to the D/A converter 13b in response to the synchronization signal SYNC. In the D/A converter 13b, a well known digital-to-analog conversion process is carried out and thereby an output analog signal which may be a video signal as already described, is obtained at the output terminal.

Further, the present invention is not limited to the embodiments described heretofore, but various variations and modifications may be made without departing from the scope of the invention.

What is claimed is:

1. A Josephson integrated circuit for performing digital logic operations with the capability of outputting the result of the operations with reduced clock rate, comprising:

a Josephson logic processor of Josephson devices, said Josephson logic processor being operated at a first clock rate and given with input data for carrying out a logic operation of the input data, said Josephson logic processor producing output data representing a result of the logic operation and a status signal indicating a status of the logic operation;

latch means comprising Josephson devices operated at the first clock rate for receiving the output data from the Josephson processor, said latch means being supplied with the status signal from the Josephson processor for holding the output data therein, said latch means being further supplied with a clear signal for resetting the output data therefrom; and data output means comprising Josephson devices operated in response to a second clock rate that is slower than the first clock rate, said data output means having an output terminal and supplied with the output data held in the latch means for passing the output data to the output terminal at the second clock rate, said data output means further producing the clear signal at the second clock rate.

2. A Josephson integrated circuit as claimed in claim 1 in which said latch means comprises a control part and a data latch part both driven at the first clock rate, wherein said control part is connected to the Josephson logic processor for receiving the status signal therefrom and producing a set command signal in response to the status signal, said control part further holding the set command signal therein, and said data latch part is connected to the control part for receiving the set command signal therefrom, said data latch part being further connected to the Josephson logic processor for receiving therefrom the output data and latching the output data in response to the set command signal.

3. A Josephson integrated circuit as claimed in claim 2 in which said data output means comprises a control part and a data holding part both driven at the second clock rate, wherein the control part of the data output means is connected to the control part of the latch means for receiving the set command signal held in the control part of the latch means at the second clock rate, said control part of the data output means further producing the clear signal at the second clock rate, and wherein the data holding part is connected to the data latch part of the latch means for receiving the data held in the data latch part at the second clock rate.

4. A Josephson integrated circuit as claimed in claim 2 in which said control part of the latch means comprises a control signal transfer part connected to the Josephson logic processor for receiving the status signal therefrom and for producing the set command signal in response to the status signal and a control signal latch part connected to the Josephson logic processor for receiving the status signal therefrom and for latching the status signal therein.

5. A Josephson integrated circuit, connected to three-phase clock devices generating three-phase clocks which are received by said Josephson integrated circuit as claimed in claim 4 in which said control signal transfer part and said control signal latch part are driven in response to the three-phase clocks running at the first clock rate, said three-phase clocks comprising a first phase clock, a second phase clock delayed by a 120 degree phase angle with respect to the first phase clock, and a third phase clock delayed by the 120 degree phase angle with respect to the second phase clock, said first through third phase clocks assuming periodically a low level state during each one-third period such that the low level state of the first phase clock is advanced relative to the low level state of the second phase clock by the 120 degree phase angle, the low level state of the second phase clock is advanced relative to the low level state of the third phase clock by the 120 degree phase angle, and the low level state of the third phase clock is advanced relative to the low level state of the first phase clock of a next cycle by the 120 degree phase angle, said first through third phase clocks having a high level state during each two-thirds period excluding the one-third period for the low level state; wherein said control signal transfer part comprises: a first latch element connected to the first phase clock such that the first latch element is reset in each low level state of the first phase clock, said first latch element being connected to the Josephson logic processor for receiving the status signal therefrom and latching the status signal during the high level state of the first phase clock, said first latch element further resetting the status signal in response to the first latch element being reset; and a second latch element connected to the second phase clock such that the second latch element is reset in each low level state of the second phase clock, said second latch element being connected to the first latch element for receiving the status signal and latching the status signal therein during the high level state of the second phase clock, said second latch element further resetting the status signal in response to the second latch element being reset, wherein said second latch element produces the set command signal when the second latch element latches the status signal therein.

6. A Josephson integrated circuit as claimed in claim 5 in which said control signal latch part comprises: a third latch element connected to the first phase clock such that the third latch element is reset in each low level state of the first phase clock, said third latch element being connected to the Josephson logic processor for receiving the status signal therefrom and latching the status signal during the high level state of the first phase clock, said third latch element further resetting the status signal in response to the third latch element being reset; a fourth latch element connected to the second phase clock such that the fourth latch element is reset in each low level state of the second phase clock, said fourth latch element being connected to the third latch element for receiving the status signal and latching the status signal therein during the high level state of the second phase clock, said fourth latch element further resetting the status signal in response to the fourth latch element being reset; a fifth latch element connected to the third phase clock such that the fifth latch element is reset in each low level state of the third phase clock, said fifth latch element being connected to the fourth latch element for receiving the status signal and latching the status signal therein during the high level state of the third phase clock, said fifth latch element further resetting the status signal in response to the fifth latch element being reset; and a first gate element connected to the first phase clock such that the first gate element is reset in each low level state of the first phase clock, said first gate element having a control terminal for receiving a control signal and connected to the fifth latch element for receiving the status signal, said first gate element latching the status signal therein during the high level state of the first phase clock only when there is provided the control signal at the control terminal, said first gate element further resetting the status signal in response to the first gate element being reset.

7. A Josephson integrated circuit as claimed in claim 6 in which said control part of the latch means further comprises a clear control part supplied with a clear signal for resetting the output data from the data latch part, said clear control part comprising: a sixth latch element connected to the second phase clock such that the sixth latch element is reset in each low level state of the second phase clock, said sixth latch element being connected to the control part of the data output means for receiving the clear signal therefrom and latching the clear signal during the high level state of the second phase clock, said sixth latch element further resetting the status signal in response to the sixth latch element being reset; a first inversion latch element connected to the third phase clock such that the first inversion latch element is reset in each low level state of the third phase clock, said first inversion latch element being connected to the sixth latch element for receiving the clear signal therefrom and latching a logic inversion of the clear signal during the high level state of the second phase clock and supplying the logic inversion of the clear signal to the control terminal of the first gate element, said first inversion latch element further resetting the status signal in response to the first inversion latch element being reset; a seventh latch element connected to the third phase clock such that the seventh latch element is reset in each low level state of the third phase clock said seventh latch element being connected to the sixth latch element for receiving the clear signal and latching the clear signal therein during the high level state of the third phase clock, said seventh latch element further resetting the clear signal in response to the seventh latch element being reset; an eighth latch element connected to the first phase clock such that the eighth latch element is reset in each low level state of the first phase clock, said eighth latch element being connected to the seventh latch element for receiving the clear signal and latching the clear signal therein during the high level state of the first phase clock, said eighth latch element further resetting the clear signal in response to the eighth latch element being reset; and a second inversion latch element connected to the second phase clock such that the second inversion latch element is reset in each low level state of the second phase clock, said second inversion latch element being connected to the eighth latch element for receiving the clear signal therefrom and latching a logic inversion of the clear signal during the high level state of the second phase clock, said second inversion latch element supplying the logic inversion of the clear signal to the data latch part for resetting the data latch part in response to the clear signal.

8. A Josephson integrated circuit as claimed in claim 7 in which said data latch part comprises: a second gate element connected to the third phase clock such that the second gate element is reset in each low level state of the third phase clock, said second gate element having a control terminal for receiving the set command signal and connected to the Josephson logic processor for receiving the output data, said second gate element latching the output data therein during the high level state of the third phase clock only when there is provided the set command signal at the control terminal, said second gate element further resetting the status signal in response to the second gate element being reset; a ninth latch element connected to the first phase clock such that the ninth latch element is reset in each low level state of the first phase clock, said ninth latch element being connected to the second gate element for receiving the output data and latching the output data therein during the high level state of the first phase clock, said ninth latch element further resetting the status signal in response to the ninth latch element being reset; a tenth latch element connected to the second phase clock such that the tenth latch element is reset in each low level state of the second phase clock, said tenth latch element being connected to the ninth latch element for receiving the output data and latching the output data therein during the high level state of the second phase clock, said tenth latch element further resetting the output data in response to the tenth latch element being reset; and a third gate element connected to the third phase clock such that the third gate element is reset in each low level state of the third phase clock, said third gate element having a control terminal for receiving the logic inversion of the clear signal from the second inversion latch means and connected to the tenth latch means for receiving the output data, said third gate element latching the output data therein during the high level state of the third phase clock only when there is provided a high level state signal at the control terminal from the second inversion latch element as the inversion of the clear signal, said third gate element further resetting the status signal in response to the third gate element being reset.

9. A Josephson integrated circuit as claimed in claim 8 in which said control part of the data output means comprises an eleventh latch element connected to a second clock running at the second clock rate, said second clock assuming one of a high level state and a low level state, said eleventh latch element being reset in response to the low level state of the second clock and connected to the fifth latch element for receiving the status signal therefrom, said eleventh latch element latching the status signal therein in response to the high level state of the second clock and supplying the status signal to the sixth latch element as the clear signal.

10. A Josephson integrated circuit as claimed in claim 9 in which said data holding part of the data output means comprises a twelfth latch element connected to the second clock such that he twelfth latch element is reset in response to each low level state of the second clock, said twelfth latch element being connected to the tenth latch element for receiving the output data and latching the output data therein in response to the high level state of the second clock.

* * * * *

UNITED STATES PATENT AND TRADEMARK OFFICE
CERTIFICATE OF CORRECTION

PATENT NO. 5,126,598
DATED : June 30, 1992
INVENTOR(S) : Seigo KOTANI

It is certified that error appears in the above-indentified patent and that said Letters Patent is hereby corrected as shown below:

Col. 2, line 37, after "job)" insert --,--;

Col. 5, line 17, after "12a" insert --,--.

Col. 13, line 2, delete "and";
line 55, "outputted" should be --output--.

Col. 14, line 2, "the" should be --a--;
line 3, "the result of the operations with reduced" should be --a result of operations with a reduced--;
line 10, insert --logic-- before "result";

Col. 15, line 2, "a" (second occurrence) should be --the--.

Signed and Sealed this

Twelfth Day of July, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,126,598
DATED : June 30, 1992
INVENTOR(S) : KOTANI

It is certified that error appears in the above-indentified patent and that said Letters Patent is hereby corrected as shown below:

Title page: [73] Assignee: Before "Japan" insert --Kawasaki,--.

Signed and Sealed this

Thirteenth Day of September, 1994

Attest:

BRUCE LEHMAN

Attesting Officer     Commissioner of Patents and Trademarks